(12) United States Patent
Lorenz et al.

(10) Patent No.: US 12,651,798 B2
(45) Date of Patent: Jun. 9, 2026

(54) CELL SEPARATING DEVICE FOR SPACING TWO ADJACENT BATTERY CELLS IN A BATTERY MODULE, AND BATTERY MODULE, AND MOTOR VEHICLE

(71) Applicant: AUDI AG, Ingolstadt (DE)

(72) Inventors: Carsten Lorenz, Reichertshofen (DE); Martin Schuessler, Koesching (DE)

(73) Assignee: AUDI AG, Ingolstadt (DE)

( * ) Notice: Subject to any disclaimer, the term of this patent is extended or adjusted under 35 U.S.C. 154(b) by 897 days.

(21) Appl. No.: 17/957,220

(22) Filed: Sep. 30, 2022

(65) Prior Publication Data

US 2023/0104209 A1 Apr. 6, 2023

(30) Foreign Application Priority Data

Oct. 1, 2021 (DE) .......................... 102021125528.7

(51) Int. Cl.
| | |
|---|---|
| *H01M 50/291* | (2021.01) |
| *H01M 10/48* | (2006.01) |
| *H01M 10/653* | (2014.01) |
| *H01M 10/658* | (2014.01) |
| *H01M 50/209* | (2021.01) |
| *H01M 50/242* | (2021.01) |
| *H01M 50/262* | (2021.01) |
| *H01M 50/298* | (2021.01) |
| *H01M 50/30* | (2021.01) |

(52) U.S. Cl.
CPC ....... *H01M 50/291* (2021.01); *H01M 10/482* (2013.01); *H01M 10/653* (2015.04); *H01M 10/658* (2015.04); *H01M 50/209* (2021.01); *H01M 50/242* (2021.01); *H01M 50/262* (2021.01); *H01M 50/298* (2021.01); *H01M 50/30* (2021.01); *H01M 2220/20* (2013.01)

(58) Field of Classification Search
CPC ............. H01M 50/291; H01M 10/653; H01M 10/658; H01M 50/30; H01M 50/262
See application file for complete search history.

(56) References Cited

U.S. PATENT DOCUMENTS

| | | | | |
|---|---|---|---|---|
| 2014/0014418 A1* | 1/2014 | Komaki | .............. | H01M 50/209 |
| | | | | 429/143 |
| 2016/0308186 A1* | 10/2016 | Han | .................... | H01M 50/209 |
| 2021/0384568 A1* | 12/2021 | Cherng | ............. | H01M 10/6551 |

FOREIGN PATENT DOCUMENTS

| | | |
|---|---|---|
| DE | 102011116777 A1 | 5/2012 |
| DE | 102011109247 A1 | 2/2013 |

(Continued)

OTHER PUBLICATIONS

Examination Report issued on Aug. 26, 2022, in connection with corresponding German Application No. 10 2021 125 528.7 (10 pp., including machine-generated English translation).

(Continued)

*Primary Examiner* — Olatunji A Godo

(74) *Attorney, Agent, or Firm* — Maier & Maier, PLLC

(57) ABSTRACT

A cell separating device for spacing two adjacent battery cells in a battery module. The cell separating device includes an incompressible frame unit and a deformable compression element enclosed by the frame unit. The frame unit includes a first frame member and a second frame member for enclosing the compression element, between which the compression element is arranged with a specified edge region.

13 Claims, 4 Drawing Sheets

(56)     References Cited

FOREIGN PATENT DOCUMENTS

| | | | |
|---|---|---|---|
| DE | 102013015752 | A1 | 3/2015 |
| DE | 112016000775 | B4 | 2/2020 |
| DE | 102019211253 | A1 | 2/2021 |
| DE | 102020105893 | A1 | 9/2021 |
| JP | 2010049842 | A | 3/2010 |
| JP | 2012119156 | A | 6/2012 |

OTHER PUBLICATIONS

Office Action issued on Dec. 19, 2025, in corresponding Chinese
Application No. 202211231166.5, 18 pages.

* cited by examiner

CELL SEPARATING DEVICE FOR SPACING TWO ADJACENT BATTERY CELLS IN A BATTERY MODULE, AND BATTERY MODULE, AND MOTOR VEHICLE

FIELD

The invention relates to a cell separating device for spacing two adjacent battery cells in a battery module. The cell separating device comprises an incompressible frame unit which is configured to withstand a mechanical load force present in case of a specified condition of use when the cell separating device is in an arranged state between the two adjacent battery cells in the battery module. In addition, the cell separating device includes a deformable compression element enclosed by the frame unit, which is configured, in the arranged state, on the one hand to absorb the mechanical load force of at least one of the adjacent battery cells and on the other hand to thermally insulate the two adjacent battery cells. The invention also relates to a battery module with a plurality of battery cells and a plurality of respective cell separating devices, which are each arranged next to one another alternately in a specified stacking direction in a module housing of the battery module. Finally, the invention also relates to a motor vehicle with at least one respective battery module.

BACKGROUND

In electrically operated motor vehicles, a battery module can be used to supply electrical energy to an electrical drive, such as an electric machine, and/or be used in an on-board network. The battery module can itself form a drive battery or high-voltage battery, for example. Alternatively, the battery module can be suitably electrically connected to one or more other battery modules to form the drive battery. The battery module includes multiple battery cells. These are configured as galvanic cells or electrochemical cells, for example. For use in a motor vehicle, storage cells or secondary batteries can be used as the battery cells. Each of the battery cells can provide electrical energy in the form of an electrical voltage or an electrical current depending on an electrochemistry or battery technology via chemical reactions of an active material.

The battery cells can be electrically connected to one another in a suitable manner to form the battery module. In addition, the battery cells can be used or arranged in a module housing of the battery module. For this purpose, two of the battery cells can be stacked adjacent to one another or side by side. In the case of arrangement in the module housing, a cell separating device or cell space separating element can be arranged between two adjacent battery cells. This means that a plurality of battery cells and a plurality of cell separating devices can be arranged or stacked next to one another or adjacent to one another in the housing in a specified stacking direction. The battery cells and the cell separating devices form what is known as a stacked structure.

On the one hand, the cell separating device can be used for thermal insulation of the adjacent battery cells. That is, heat conduction between the adjacent battery cells can be prevented. In this way, if one of the battery cells overheats and is affected by thermal runaway, for example, it can be prevented that the other battery cells also overheat or run away in a chain reaction. On the other hand, the cell separating device can absorb or compensate for swelling forces, i.e. so-called swelling, of the battery cells. Swelling is an increase in volume and/or a reduction in the volume of the battery cells along the stacking direction in normal operation. A general distinction is made between long-term swelling due to aging processes and short-term swelling when charging or discharging the battery cell. To form the stacked structure of cell separating devices and battery cells, the stacked structure can be pressed in the stacking direction during production or manufacture and fitted into the desired housing. During pressing, the components of the stacked structure are braced and the cell separating devices can thus be used to pre-tension the battery cells, as a result of which a pre-tensioning force can counteract the swelling.

Different configuration options are known for cell separating devices. According to one configuration option, the cell separating device can be formed from a flexible or deformable material.

For this purpose, a battery pack with a flexible or deformable spacer is known from DE 10 2011 116 777 A1, for example, which spacer is arranged between two battery cells of the battery pack. The spacer counteracts undesirable movement of the battery cells during operation of the battery pack.

With such a flexible spacer, there is the disadvantage that a distance between the cells can be set arbitrarily during pressing in production. Pressing is either force-controlled or path-controlled. This means that the spacing between the cells can vary and have a tolerance. There is therefore no clear positioning for the individual battery cell during assembly in the stacking direction in the housing.

According to another configuration option, the cell separating device can be formed from a rigid or incompressible material.

For this purpose, for example, DE 10 2011 109 247 A1 discloses a submodule as part of a cell block. The submodule includes a prismatic cell and a frame that serves as a spacer. Multiple such submodules are combined in the cell block.

A clear or fixed position of the battery cells in the housing can be defined by means of the spacer. However, the spacer is not suitable for absorbing or compensating for the swelling forces during swelling. As a result, the battery cells in the stacked structure can age faster and the service life of the battery module is reduced.

Another configuration option consists in forming the cell separating device from a combination of a flexible and a rigid material.

To this end, DE 10 2019 211 253 A1 discloses a battery module with multiple adjacent battery cells. A spacer element is used in each case in an intermediate space between two adjacent battery cells. The spacer element may be formed from a rigid material that does not deform as the battery cells swell. A deformable compensation element can be arranged in an interior space formed by the frame member. This element is compressible and can thus absorb the swelling forces.

SUMMARY

It is the object of the present invention to provide an improved option for enclosing a compression element in a frame unit for a cell separating device.

The invention relates to a cell separating device for spacing two adjacent battery cells in a battery module. The invention also relates to a battery module with a plurality of battery cells and a plurality of respective cell separating devices. The battery cells and the cell separating devices are alternately arranged in a specified stacking direction next to each other, i.e., adjacent, in a module housing of the battery module. The cell separating devices and the battery cells can thus form a stacked structure.

Furthermore, the invention also relates to a motor vehicle having at least one such battery module. The battery module can, for example, be used to operate an electric drive and/or an on-board network of the motor vehicle. For example, multiple such battery modules can be combined in one drive battery. The motor vehicle is preferably configured as an automobile, in particular as a passenger vehicle or truck, or as a passenger bus or motorcycle.

The cell separating device according to the invention comprises an incompressible frame unit which, in a state in which the cell separating device is arranged between two adjacent battery cells, is configured to withstand a mechanical load present in a specified condition of use. This means that the cell separating device can withstand a specified mechanical load.

The condition of use exists, for example, when the battery module is used as intended. The intended use can be, for example, operating the battery module in a charging or discharging mode. This means that the intended use can be a predefined battery operation or operating mode of the battery module. The mechanical load can accordingly be a swelling force of the battery cells, for example, which occurs during the swelling described at the outset. The intended use can also be present in a production process or manufacturing process of the battery module, for example. That is to say, for example, when the battery cells and the cell separating devices are pressed into the stacked structure and introduced into the module housing. The mechanical load can accordingly be a clamping or pressing force that is present during, or as a result of, the pressing into the stacked structure described above, for example. The specified condition of use may not be present, for example, if the motor vehicle with the battery module is involved in an accident or crash. In this case, it may be that a mechanical load on the battery module is so high that the cell separating device can no longer withstand it.

Furthermore, the cell separating device comprises a deformable compression element enclosed by the frame unit. On the one hand, the compression element in its arranged state is configured to absorb the mechanical load force of at least one of the adjacent battery cells. This means that the compression element can deform when the mechanical load is present. Thus, the compression element is deformable when the frame unit is not deformable. On the other hand, the compression element is configured to thermally insulate the two adjacent battery cells. That is, the compression element can inhibit or prevent heat conduction or transfer of thermal energy between the adjacent battery cells.

To enclose the compression element, the frame unit comprises a first frame member and a second frame member. The first frame member may be referred to as a holding frame and the second frame member may be referred to as a closure frame. The compression element is positioned with a specified edge area between the first and second frame members. In other words, the frame members completely or at least partially enclose the compression element on a front side and a rear side in the specified edge area of the compression element. The compression element is thus clamped or braced between the frame members.

Overall, the cell separating device is therefore formed from a stable or incompressible frame and a softer, compressible material in the middle area, i.e., an interior space or inner area spanned by the frame. This results in the advantage that the battery cells can be arranged in a clear positioning in the module housing, for example during production or manufacturing. This means that the adjacent battery cells can be joined and/or be pressed at a specified spacing. The specified spacing is specified by the dimensions of the incompressible first frame member. In addition, the swelling described at the outset and the thermal propagation described at the outset can also be prevented at the same time by means of the frame unit by inserting the compression element. By clamping the compression element between the frame members, a particularly stable fastening of the compression element in the cell separating device can also be implemented. This can prevent the compression element from becoming detached from the frame unit, for example when absorbing the mechanical loading force.

To achieve the desired deformability of the compression element, the compression element can have a material with a specified elasticity value, which corresponds to high mechanical elasticity. The deformation can be plastic or elastic, for example. As a result, a swelling force of the respective adjacent battery cell can be compensated and the swelling of the battery cells can thus be enabled, for example. At the same time, this can also allow the battery cells in the stacked structure to be biased in a delivery state, for example during the manufacturing process. A biasing force can then counteract the swelling, for example. To be able to absorb the mechanical load particularly well, the compression element can be compressible, for example, along the stacking direction mentioned. That is, the compression element may have the best compression properties or the highest deformability parallel to the stacking direction.

In addition, the compression element can also have a material with a specified thermal conductivity to provide the thermal insulation. The thermal conductivity value refers to a low thermal conductivity, such that no or at most hardly any heat transport or heat flow between the adjacent battery cells is possible. As a result, thermal propagation, i.e., heat conduction, can be avoided in the event of overheating, for example in the event of thermal runaway of a battery cell.

To provide the desired resistance to the mechanical loading force, the frame unit can be made of a material with a specified strength and/or have a stiffness value. The strength and/or stiffness value corresponds to high mechanical strength and/or rigidity. Consequently, essentially no mechanical deformation of the frame unit is possible given the specified mechanical load in the battery module. The frame unit thus has a higher strength or rigidity than the compression element. Conversely, the compression element has a higher elasticity than the surrounding frame unit.

In addition, the frame unit can also be configured to electrically insulate the adjacent battery cells. This means that the frame unit can have a material with a specified electrical resistance value, which corresponds to such a high electrical resistance that essentially no or at most a negligibly small current flow between the battery cells is possible.

The invention also comprises embodiments which result in additional advantages.

In one embodiment, an installation position or orientation of the cell separating device in the battery module is described in more detail. In this case, in the arranged state, a front and rear side of the frame unit with the bordered compression element is a respective contact surface or abutment surface of the cell separating device for the adjacent battery cells. At least one frame outside of the frame unit forms a side face of the cell separating device. This means that the cell separating device can comprise two opposing contact surfaces and at least one side face. One of the adjacent battery cells can rest with its respective contact surface at least partially or completely on each of the contact surfaces. This means that a contact surface of the cell separating device partially or completely covers the contact surface of the respective battery cell. The opposing contact surfaces are connected to one another by means of the at least one side face. This means that the respective side face can support the contact surfaces against one another.

In the arranged state, the respective side face can be used to support or hold the cell separating device in the module housing. This means that the respective side face can rest against a housing wall of the module housing, for example. In the arranged state, the respective side face of the cell separating device can lie parallel, i.e., in one plane, with a corresponding side face of the battery cell. This means that the side faces of the cell separating device and the battery cells can end flush with one another, at least in certain areas. The side faces thus form an outer surface for the stacked structure.

Depending on their geometric shape, the cell separating device and accordingly also the battery cells can have one or more side faces. The individual battery cells can be formed in this case as prismatic cells, for example. That is, the battery cells have a substantially rectangular cross section. Correspondingly, the cell separating device can also have a prismatic configuration. The cell separating device then comprises four side faces, for example, wherein two of the side faces always form opposite sides.

The dimensions of the cell separating device, in particular the frame unit, can be adapted to the dimensions of the battery cells. For example, a profile width and profile depth of the frame unit can be adapted to the dimensions and the swelling behavior of the battery cells used. The profile depth determines the depth or width of the cell separating device, i.e., its side face. This means that the profile depth specifies the spacing between the battery cells when they are in place. The profile depth of prismatic cells can be two to four millimeters, for example. The profile depth can vary depending on a width or depth of the battery cells.

In comparison, the profile width determines the size of a viewing window, i.e., the interior space spanned by the frame members. The dimension of the interior is referred to as the rebate dimension of the frame unit. The profile width thus determines how large the proportion of the contact surface is that is covered by the frame unit. For example, the profile width can cover two to 20 percent of the contact surface. It can thus be ensured that the swelling of the battery cells is mainly absorbed by the compression element. Because the largest deformation of the battery cells in the range of a few millimeters usually occurs in the middle in the area of the abutment surfaces. At the outer edges or outer areas of the abutment surface, the battery cell deforms at most in the micron range. For example, the profile width can be between five and ten millimeters for typical prismatic cells.

In the following embodiments, the next topic is how the frame unit can be configured to hold the compression element.

In one embodiment, the first frame member has a receiving space which is configured to receive the specified edge area of the compression element and the second frame member. In the received state, the second frame member is surrounded on at least two sides in the receiving space in the first frame member. In other words, the first frame member forms a frame or socket for the second frame member. The first frame member can thus, for example, completely or partially encompass the second frame member. A surface of the receiving space can thus completely cover or overlap the second frame member on two sides. The second frame member can be partially delimited by the receiving space. When arranging the compression element in the edge area and the second frame member in the receiving space, the first frame member and the second frame member can be flush, for example. In the delivery state, the compression element can also be flush with the frame unit, for example. This means that the contact surfaces each form a two-dimensional plane.

This results in the advantage that the first frame member can be used, for example, for equipping with fastening means or spacer elements for components in the battery module.

To form the receiving space, the first frame member can have a circumferential recess on the front or rear side, i.e., from the direction of one of the two contact surfaces, in an inner area in the direction of the center point of the contact surfaces. The recess can form the receiving space. This means that the first frame member can have two different profile depth ranges. A first area, i.e., an external area, corresponds to the profile depth of the frame unit. A second area, i.e., an inner area, has a lower profile depth than that of the frame unit. When arranging or accommodating the second frame unit and the compression element in the inner area, they can fill up the smaller profile depth, resulting in the overall profile depth of the frame unit.

The first frame member can also determine the profile width for the frame unit based on the receiving space. The second frame unit, on the other hand, has a smaller profile width. The second frame member is adapted to the dimensions of the inner area of the first frame member. The edge area of the compression element can also be adapted to the dimensions of the inner area of the first frame member. The overall profile width for the frame unit results again in the assembled or arranged state of the first and second frame units, however.

In another embodiment, the first frame member has at least one pin element for fastening the compression element between the frame members, and the second frame member has at least one pin receiving element assigned to the respective pin element. The pin element and the pin receiving element can be connected to one another in an intended fastening position. In the specified edge area, the compression element also has at least one associated through-opening for the respective pin element. The through opening can be a hole, for example, which is worked into or introduced into the edge area. The respective pin element can be passed through this through-opening, for example completely. This means that the compression element can be threaded or plugged onto the pin element by means of the through-opening. In this case, the pin element can protrude from the compression element perpendicularly to the contact surface in its passed-through state. Of course, the compression element can have a plurality of such through-openings in the edge area, for example. Correspondingly, the first and the second frame members can also have a plurality of pin elements and pin receiving elements. This results in the advantage that the compression element can be fixed in a particularly stable manner between the frame members. It is thus possible to prevent the compression element from slipping when the mechanical load is applied.

The pin element can be a nose or a pin with any geometric cross-sectional shape, for example. The pin-receiving element can be implemented as a through opening or receiving recess or recess opening, for example. To connect the pin element and the respective pin receiving element, these can be connected or fastened to one another in the intended fastening position. In the fastening position, the pin element can be inserted or pushed through into the pin receiving element, for example. The connection can be made by means of a plug-in connection or snap-in connection, for example. Alternatively, the pin member and pin receiving member may be glued or welded or heat staked. For example, the pin member may be arranged in the aforesaid receiving space. The pin element can protrude from the first frame member perpendicular to the contact surface. Correspondingly, the assigned pin-receiving element can be worked into the first frame member perpendicularly to the contact surface. As an alternative to the described embodiment, the second frame member can have the aforementioned pin element and the first frame member can have the aforementioned pin receiving element, for example.

The following embodiments now deal with how the cell separating device can be configured for optimum positioning or fastening in the battery housing.

In one embodiment, at least one respective side face of the cell separating device has a spacer structure with at least one spacer means. The spacer structure can thus comprise one or more spacer means. The respective spacer means protrudes perpendicularly from the side face. When the cell separating device is in the arranged state in the module housing, the spacer structure can be used to keep a specified distance from a housing wall of the module housing or a battery housing of the drive battery. In addition, this can also make it easier to position the cell separating device in a manufacturing process on the housing. The spacer structure can thus be used as a positioning aid. When forming the stacked structure with the battery cells, the respective spacer means can protrude from or protrude beyond the aforementioned outer surface of the stacked structure, for example.

The spacer structure can thus also be used to protect the side faces of the battery cells in the stacked structure, for example during transport or during production.

This means that the cell separating device can only abut directly with the spacer structure on the respective housing wall of the battery module or a battery housing.

The spacer structure can be included in or incorporated into the frame unit, in particular the first frame member, for example. The side face can be a bottom side of the cell separating device, which in the arranged state can be aligned parallel to a housing bottom of the battery module or to the battery housing as the housing wall. Additionally or alternatively, the side face can be a wall side of the cell separating device, which in the arranged state can be aligned parallel to a side wall of the battery module or to the battery housing as a housing wall.

The spacer can be an elevation or a nub, for example. That is, the spacer means may be referred to as a spacer block, for example. The spacer means may have a rectangular cross-section, for example. The spacer means can extend in a direction of extension, i.e., parallel to the side face, for example partially or completely over the side face. This means that the spacer structure can have a plurality of spacer means, for example, which are arranged at a specified distance next to one another on the respective side face. As a result, unevenness or tolerances in the housing wall of the housing or the battery housing can be compensated for by means of the spacer means, for example.

In another embodiment, at least one of the respective side faces of the cell separating device has a recess structure with at least one recess. The recess structure is configured to accommodate a thermally conductive medium which, in the arranged state, is attached to a housing wall assigned to the battery module for the thermal coupling of the battery cells. The thermally conductive medium can be a thermally conductive paste, for example. The thermally conductive medium can be used to thermally connect the battery cells to a heat sink of a cooling device, for example. The battery cells can be cooled by means of the cooling device when the battery module is operated as intended. The recess structure has the advantage that an excess of the thermally conductive medium can be accommodated there when the cell separating device is inserted into the module housing, for example during manufacture.

The recess structure can be encompassed by the frame unit, in particular the first frame member, for example. In the present case, the side face can be a bottom side of the cell separating device, for example, which in the arranged state can be aligned parallel to the aforementioned housing bottom of the battery module or the battery housing. The recess of the recess structure can be worked into the side face of the cell separating device, for example as a slit or depression. For example, the recess may have a substantially triangular cross-section. The recess can extend along a specified extension direction, i.e., in the side face, completely or in sections over the respective side face. The extension direction can run perpendicularly to the contact surface, i.e., in the stacking direction, for example. Alternatively, the extension direction can run along the side face, i.e., parallel to the contact surface.

The following embodiments now deal with various fastening means that the cell separating device can have to fasten different components thereto. The fastening means described below result in the advantage that no additional components need to be provided in the battery module for fastening or securing the components. In this way, installation space and also weight, for example, can be saved in the battery module.

In one embodiment, at least one of the respective side faces of the cell separating device has at least one latching element. The latching element is configured to fasten a gas discharge duct for the battery cells by means of a latching connection. The gas discharge duct can serve as a pipe system for discharging a harmful gas that can form when a battery cell is defective, for example. The harmful gas can, for example, flow out of a specified break point or breakout opening of the respective battery cell into the gas discharge duct and be conducted away from the battery module there by means of suitable ventilation or a suitable extraction system. The latching element can be a latching lug, for example. To fasten the gas discharge duct, the latching element can be clipped to a counterpart that is arranged on the gas discharge duct. Fastening can thus be achieved by means of a positive or non-positive connection. The latching element can, for example, be encompassed by the frame unit, in particular the first frame member. The side face for attaching the latching element can be a cover side of the cell separating device, for example. The cover side is a side which, in the arranged state, can be aligned parallel to a housing cover of the module housing or a battery housing as the housing wall, for example.

In another embodiment, at least one of the respective side faces of the cell separating device has at least one slide-in element for inserting and holding at least one ribbon conductor element. The ribbon conductor element is configured for data exchange between at least one of the adjacent battery cells and a monitoring device of the battery module. The slide-in element can be implemented, for example, by a depression or recess in the side face, which is partially covered by an L-shaped or hook-shaped projection running along the side face. The ribbon conductor element can thus be pushed into the slide-in element, for example parallel to the side face, i.e., along the abutment surfaces. In the pushed-in state, the ribbon conductor element is thus pushed through the push-in element perpendicularly to the abutment surfaces. The ribbon conductor element can be held loosely by means of the slide-in element. Alternatively, a non-positive or positive connection can be provided. The side face for attaching the slide-in element can be a cover side of the cell separating device, for example. The slide-in element can be encompassed by the frame unit, in particular the first frame member, for example.

The ribbon conductor element can be a ribbon cable or a flexible printed circuit, for example. For example, one or more sensors for monitoring the battery cells can be incorporated into the ribbon conductor element. Alternatively, the ribbon conductor element can be connected to a corresponding sensor unit for monitoring the respective battery cell. The monitoring device can have a control unit for evaluating or monitoring the battery cells, for example.

The sensors or the sensor unit can provide detected sensor values as data to the monitoring device for evaluation, for example. Additionally or alternatively, the monitoring device can provide data in the form of control signals for the sensors or the associated sensor unit.

In another embodiment, at least one of the respective side faces of the cell separating device has at least one cable clamping element for fastening a conductor cable by means of a clamping connection. The conductor cable is configured for data exchange between at least one of the adjacent battery cells and a monitoring device of the battery module. Additionally or alternatively, the conductor cable can also be configured for data exchange between the monitoring device and an on-board control unit or battery management system of a motor vehicle, for example. Such a conductor cable substantially has a round cross section. The cable clamping element can thus have a round feed-through opening, for example. The cable clamping element can be configured as a cable clamp or cable clip, for example. For example, the cable clamping element can be implemented by an omega clip. When the conductor cable is clamped in the cable clamping element, a non-positive or positive connection can be realized. The cable clamping element can be arranged on the side face in such a way that the feed-through opening of the cable clamping element is aligned perpendicular to the opposite contact surfaces, for example. Thus, when the cell separating device is in the arranged state, the conductor cable can be guided along the stacked structure, that is to say, in the direction of the stack, along the battery cells and cell separating device elements. The side face for attaching the cable clamping element can be a cover side of the cell separating device, for example. The cable clamping element can in this case be encompassed by the frame unit, in particular the first frame member, for example.

In another embodiment, at least one of the respective side faces of the cell separating device has a retaining web structure with at least one retaining web. That is, the retaining web structure may include one or more retaining webs. A plurality of retaining webs can be arranged next to one another at a specified spacing along the side face, for example. The respective retaining web is configured to protrude along the side faces perpendicularly to the two opposite contact surfaces. In the arranged state, the retaining web correspondingly overlaps a side face of the respectively adjacent battery cells that is adjacent to the side face. The retaining web can thus prevent the battery cells from slipping parallel to the contact surfaces. This means that the retaining web can exert a retaining force for the battery cells perpendicularly to the respective side face. The retaining web is configured as an extension of the side face of the cell separating device. The side face for arranging the retaining web structure can be the aforementioned cover side of the cell separating device, for example. Thus, the battery cells in the battery module can be held down towards the bottom of the housing by means of the cell separating device. The retaining web structure can be encompassed by the frame unit, in particular the first frame member, for example.

The following embodiment is about how the compression element can be designed. The compression element has an enveloping material and a compression material. The compression material is completely encased by the enveloping material and the specified edge area of the compression element is only formed by the enveloping material. The covering material thus has a larger area than the compression material. The enveloping material overlaps the compression material at the sides or edges. Thus, the compression element can have a smaller thickness in the edge area. The fastening of the compression element between the frame members can thus be simplified. For example, the enveloping material can form a protective layer for the compression material. For example, the enveloping material can protect the compression material from moisture or other environmental influences. The compression material, on the other hand, can be the functional layer of the compression element. This means that load force absorption and thermal insulation are implemented through the compression material.

The invention also comprises combinations of the features of the embodiments described. The invention also comprises implementations that each have a combination of the features of multiple of the embodiments described, provided that the embodiments were not described as mutually exclusive.

BRIEF DESCRIPTION OF THE FIGURES

Exemplary embodiments of the invention are described hereinafter. Wherein.

DETAILED DESCRIPTION

Figure 1:
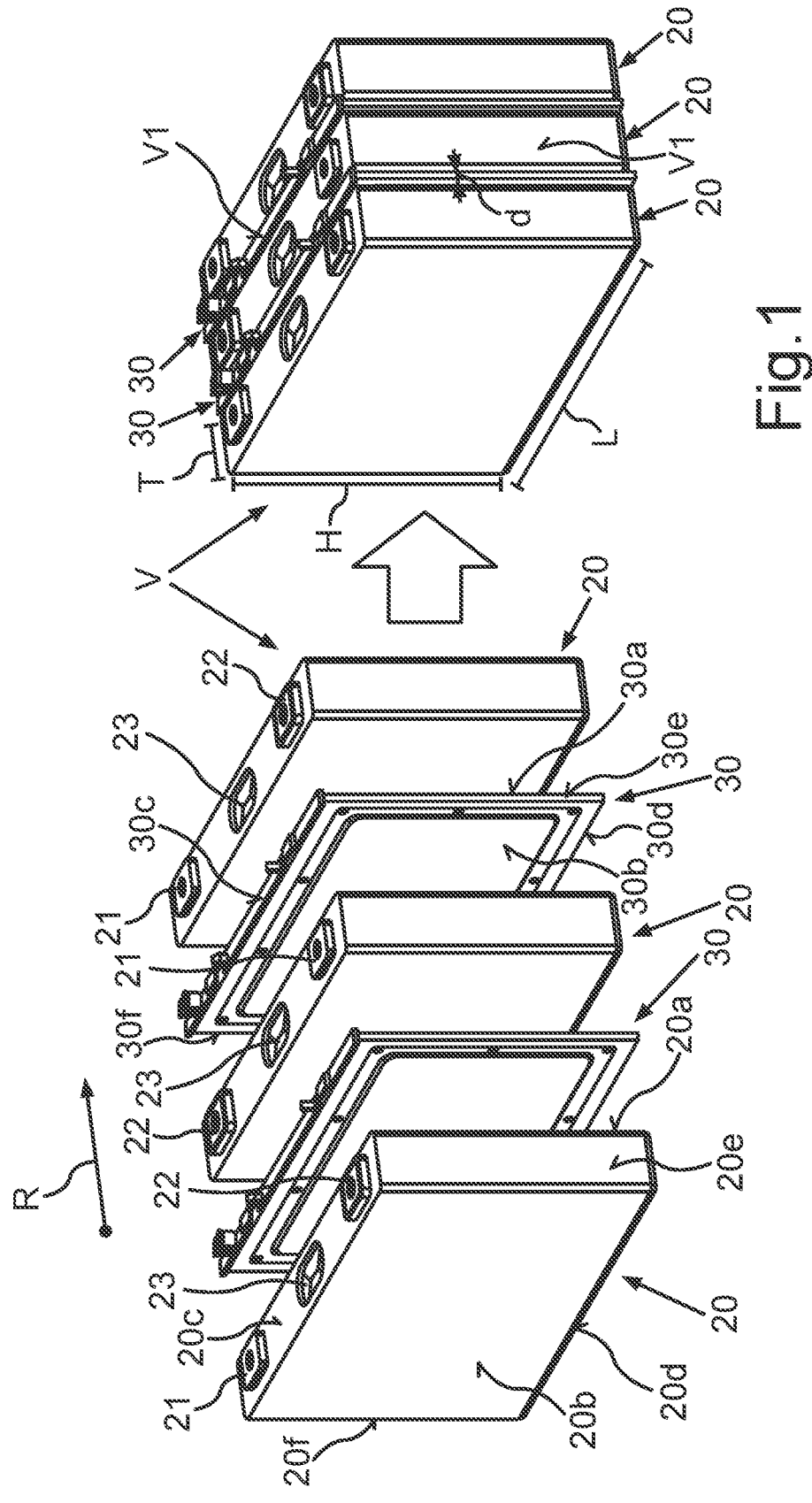
FIG. 1 shows a schematic representation of a stacked structure with a plurality of battery cells and a plurality of cell separating devices.

The exemplary embodiments explained hereinafter are preferred embodiments of the invention. In the exemplary embodiments, the described components of the embodiments each represent individual features of the invention to be considered independently of one another, which each also refine the invention independently of one another. Therefore, the disclosure is also intended to comprise combinations of the features of the embodiments other than those represented. Furthermore, the described embodiments can also be supplemented by further ones of the above-described features of the invention.

In the figures, the same reference numerals designate elements that have the same function.

FIG. 1 shows a stacked structure V of a plurality of battery cells 20 and a plurality of cell separating devices 30. For better understanding, FIG. 1 shows the stacked structure V once in an exploded view and once in the joined or assembled state. In FIG. 1, three battery cells 20 and two cell separating devices 30 are shown as examples.

The battery cells 20 in FIG. 1 are preferably configured as prismatic cells. That is, the battery cells 20 have a substantially rectangular cross section. The respective battery cell 20 thus has six sides or surfaces. The two largest surfaces form a front and rear side of the battery cell 20. The front side forms a contact surface 20a in the stacked structure. The opposite rear forms a contact surface 20b in the stacked structure. The remaining four sides form the outside of the battery cell and are referred to below as side faces 20c, 20d, 20e, 20f. The side face 20c, which is shown from above in FIG. 1, can be a ceiling side of the battery cell 20, for example. The side face 20d, which is shown from below in FIG. 1, can be a bottom side of the battery cell 20, for example. The side face 20e, which is shown on the right in FIG. 1, can be a wall side of the battery cell 20, for example. The side face 20f, which is shown on the left in FIG. 1, can also be a wall side of the battery cell 20, for example. The side faces 20c and 20d and the side faces 20e and 20f each form opposite side faces of the battery cell 20.

The respective battery cell 20 can be an electrochemical or galvanic cell. These individual battery cells 20 can be configured as lithium-ion cells, for example. To provide electrical energy, the battery cells 20 each have two connection contacts or connection poles. A first of the connection contacts is a positive pole 21 and a second of the connection contacts is a negative pole 22. In normal operation of the respective battery cell 20, the connection contacts 21, 22 can be subjected to an electrical voltage to provide the electrical energy. According to FIG. 1, the connection contacts 21, 22 are arranged or constructed on the side face 20c. A so-called breakout opening 23 or specified break point is also arranged on the side face 20c, i.e., the top side. A harmful gas, which can form if the battery cell 20 is defective, can escape from the respective battery cell 20 via this breakout opening 23.

Analogously to the configuration of the battery cells 20, the cell separating devices 30 according to the exemplary embodiment in FIG. 1 are also shown in a basic prismatic shape. This means that the respective cell separating device 30 has a substantially rectangular cross section. Thus, the respective cell separating device 30 also includes six surfaces or sides. The two largest surfaces form a front and rear side of the respective cell separating device 30. The front side forms a contact surface 30a in the stacked structure. The opposite rear forms a contact surface 30b in the stacked structure. The remaining four sides form the outside of the cell separating device 30 and are referred to below as side faces 30c, 30d, 30e, 30f. The side face 30c, which is shown from above in FIG. 1, can be a ceiling side of the cell separating device 30, for example. The side face 30d, which is shown from below in FIG. 1, can be a bottom side of the cell separating device 30, for example. The side face 30e, which is shown on the right in FIG. 1, can be a wall side of the cell separating device 30, for example. The side face 30f, which is shown on the left in FIG. 1, can also be a wall side of the cell separating device 30, for example. The side faces 30c and 30d as well as the side faces 30e and 30f each form opposite side faces of the cell separating device 30.

To form the stacked structure V, the battery cells 20 and the cell separating devices 30 are arranged next to one another or adjacent to one another in a specified stacking direction R. A cell separating device 30 is arranged in each case between two adjacent battery cells 20. Conversely, a battery cell 20 is arranged in each case between two adjacent cell separating devices 30. For the adjacent arrangement, the cell separating devices 30 are each arranged with their respective contact surfaces 30a, 30b on the respective contact surfaces 20a, 20b of the battery cells 20. The respective contact surfaces 20a, 20b, 30a, 30b can rest directly or completely on one another, for example. As shown in FIG. 1, the cell separating devices 30 can close the battery cells 20 flush with one another with their respective side faces 20c to 20f and 30c to 30f. In the stacked structure V, the respective side faces 30c to 30f and 20c to 20f thus form a respective outer surface V1 for the stacked structure.

Figure 4:
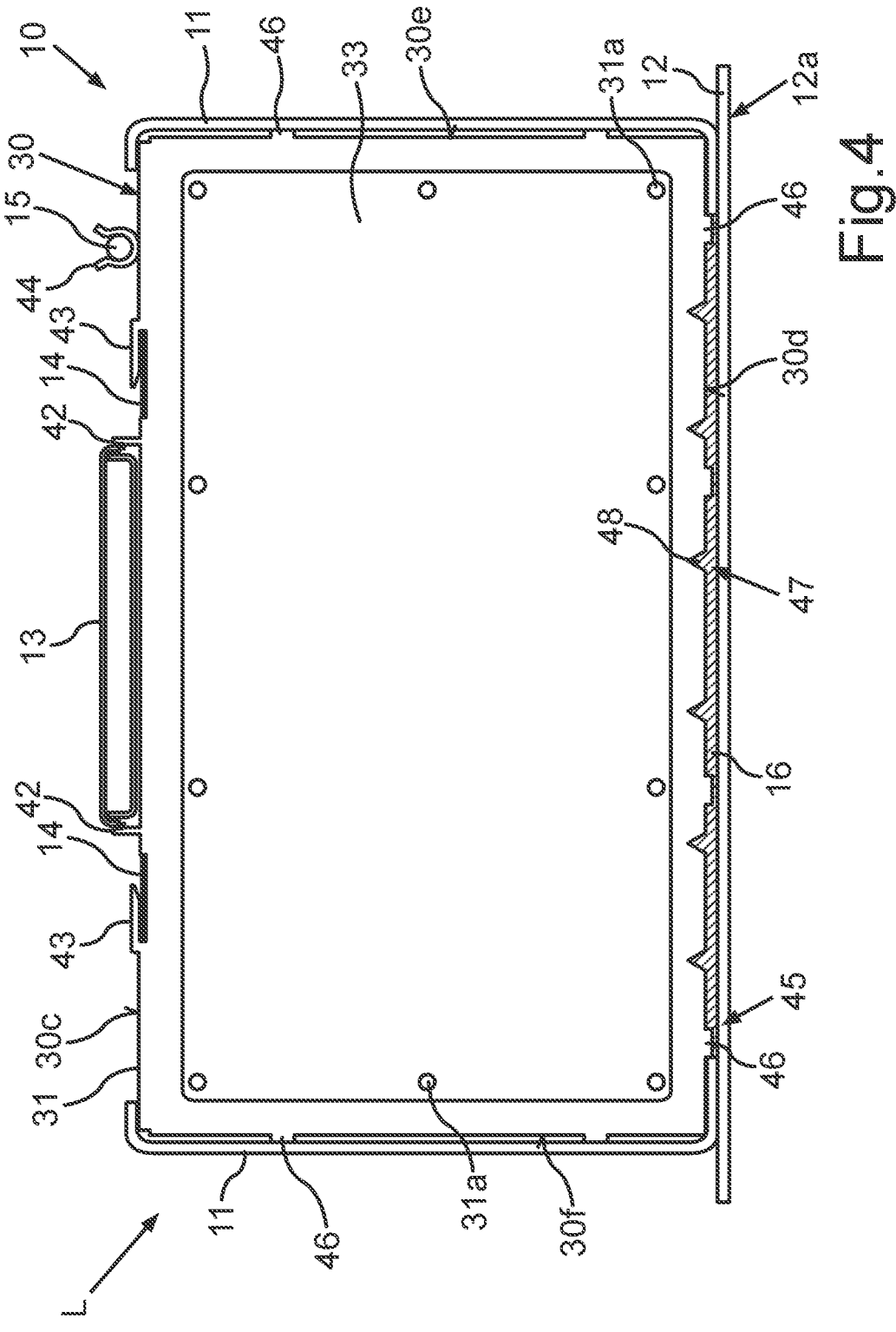
FIG. 4 shows a schematic representation of one of the cell separating devices according to FIG. 1 in an installed state in a battery module.

The stacked structure V shown in FIG. 1 can be used, for example, to form a battery module 10 for a drive battery of a motor vehicle. When the battery cells 20 are in operation, the battery cells 20 can thus provide electrical energy for operating the motor vehicle, i.e., for example, an electric drive of an on-board network of the motor vehicle. For this purpose, the battery cells 20 can, for example, be electrically connected to one another in a suitable manner, resulting in a desired electrical power or amount of energy for operating the motor vehicle. In a manufacturing or production process, the stacked structure V can also be used or inserted into a module housing 11 of the battery module. The module housing 11 can be provided by so-called side binders, for example. Such a side binder as a module housing 11 is shown in FIG. 4 by way of example. A side binder as a module housing 11 comprises two housing walls or housing shells, which surround or enclose the stacked structure V from two opposite sides, in the present case, for example, in each case from the direction of the side faces 30e, 20e and 30f, 20f. The side faces 20c, 20d and 30c, 30d are at least partially exposed from the module housing 11 to enable electrical contact and thermal coupling of the battery cells 20. The contact surfaces 20a and 20b of the two outermost battery cells 20 in the stacked structure V can be completely or partially enclosed by an additional housing wall of the module housing 11. The stacked structure V can thus be assembled or held compactly by the module housing 11.

For introduction into the module housing 11, the stacked structure V can be pressed in a manufacturing or production process. During the pressing, the battery cells 20 and the cell separating devices 30 are compressed in the stacking direction R. In the process, the cell separating devices 30 are clamped to the battery cells 20.

On the one hand, the cell separating devices 30 in the stacked structure V have the function of maintaining a specified spacing between two adjacent battery cells 20. On the other hand, the cell separating devices 30 have the function of intercepting or absorbing a mechanical load that occurs when the stacked structure V is used in a specified manner. Such a mechanical load can be, for example, a swelling force that the respective battery cell 20 exerts when there is an increase or decrease in volume. These changes in volume inevitably result from aging processes in charging or discharging operation of the battery cells 20. The changes in volume are also referred to as swelling. The mechanical load can also be a clamping force, for example, which occurs when the stacked structure V is pressed. Finally, the cell separating device 30 should also ensure thermal insulation of the battery cells 20 in the stacked structure V from one another. This means that it should be prevented that, when one of the battery cells 20 heats up, it can also give off its thermal energy to the other battery cells 20.

Figure 2:
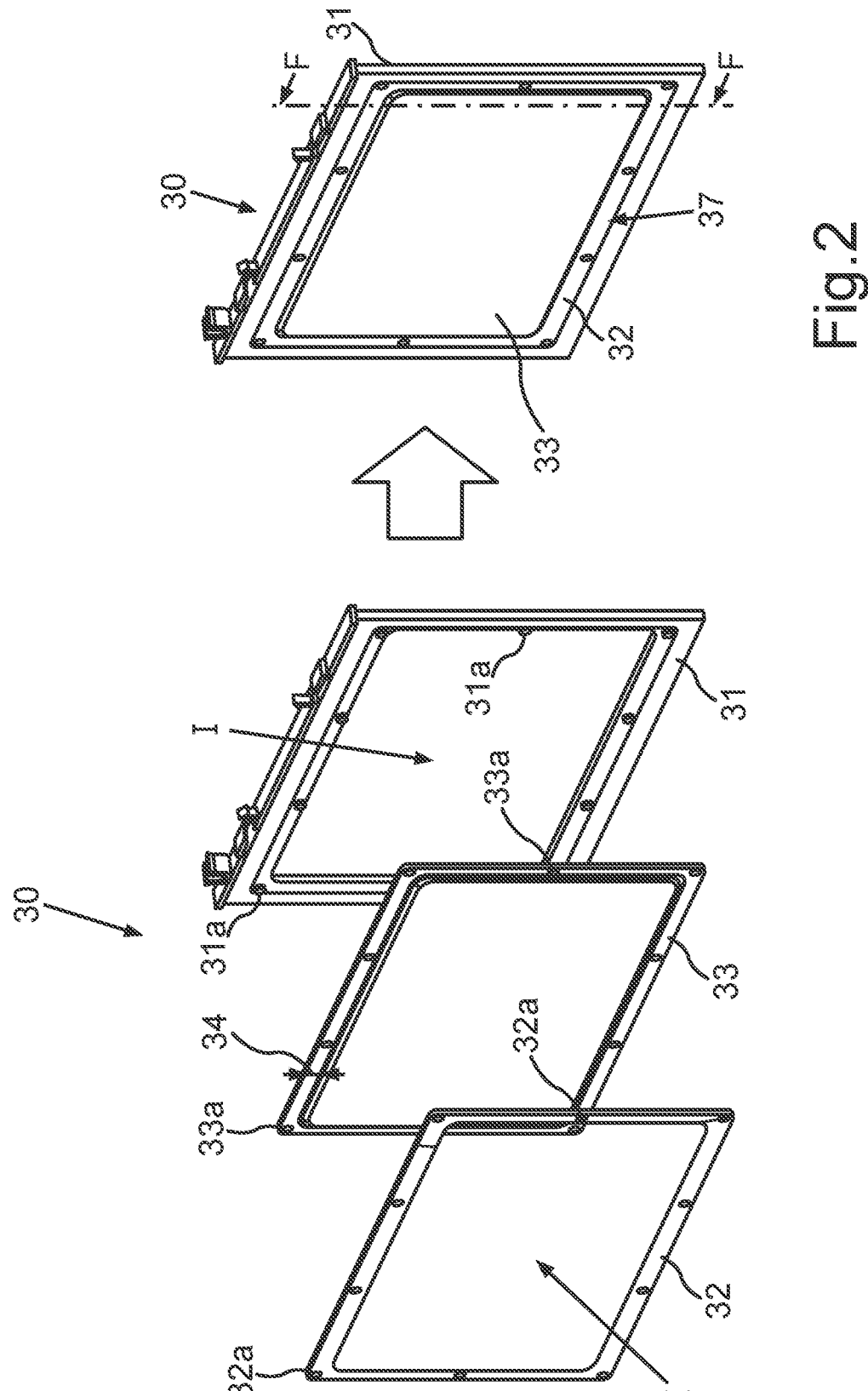
FIG. 2 shows a schematic representation of one of the cell separating devices according to FIG. 1.

In order to provide these functions, the respective cell separating device 30 comprises a stable or incompressible frame and a softer, compressible material in the middle area. The corresponding design of the cell separating device 30 can be explained in more detail with reference to FIG. 2. FIG. 2 shows a schematic representation of one of the cell separating devices 30 according to FIG. 1. For a better overview, the cell separating device 30 is shown once in an exploded view and once in the joined or assembled state. The cell separating device 30 includes an incompressible frame unit 37 as the frame. That is, the frame unit 37 has a high mechanical rigidity and thus experiences essentially no mechanical deformation under mechanical stress in the intended use or operation of the battery module 10. For example, the frame unit have a hard, inflexible or rigid plastic as the material. Corresponding materials that are suitable for converting the frame unit 37 are generally known. According to FIG. 2, the frame unit 37 forms a circumferential frame with four frame profiles or frame webs, through which the prismatic shape of the cell separating device 30 is implemented. The frame unit 37 provides an interior space I, which forms a so-called rebate dimension of the frame unit 37. A deformable compression element 33 is inserted or introduced into this interior space I. The compression element 33 is surrounded or clamped by the frame unit 37. The compression element 33 can deform under mechanical stress. That is, it can reduce the mechanical stress force, such as the swelling force and/or absorb or compensate tension. For this purpose, a material with high mechanical elasticity can be selected for the compression element. Nevertheless, the material must be chosen such that the compression element is suitable for biasing the battery cells. This means that the compression element 33 should provide a biasing force which can counteract the swelling, i.e., the swelling force. In addition, the compression element can also provide thermal insulation between two adjacent battery cells 20. For this purpose, the compression element 33 can have a material with a low thermal conductivity. Respective materials that are suitable for converting the compression element 33 are generally known.

For enclosing or holding the compression element 33, the frame unit 37 comprises a first frame member as a holding frame 31 and a second frame member as a closure frame 32, as shown in FIG. 2. The compression element 33 is arranged with a specified edge region 34 between the holding frame 31 and the closure frame 32. This means that the frame members 31, 32 completely enclose the compression element 33 in the circumferential edge area 34 on the front and back, i.e., the contact surfaces 30a and 30b. The compression element 33 is thus clamped between the holding frame 31 and the closure frame 32.

In order to further improve the fixing and the positioning of the compression element 33 between the frame members 31, 32, the holding frame comprises at least one pin element 31a. The closure frame 32 includes at least one associated pin-receiving element 32a. In the edge region 34, the compression element 33 comprises at least one associated through-opening for the respective pin element 31a. In the present exemplary embodiment according to FIG. 2, ten such pin elements 31a with associated pin receiving elements 32a and through-openings 33a are shown as an example. These are regularly arranged circumferentially on the respective frame member 31, 32 and the edge area 34. In the present case, the respective pin element 31a is configured as a cylindrical bulge which protrudes from the holding frame 31 perpendicularly to the contact surface 30b. To fasten the compression element 33 between the frame members 31, 32, the compression element 33 with the through-openings 33a can now be threaded onto the pin elements 31a. The respective pin element 31a can be guided or inserted completely through the associated through-opening 33a. Then the closure frame 32 with the respective pin receiving element 32a can also be plugged onto the associated pin element 31a. According to FIG. 2, the pin-receiving element 32a can also be configured, for example, as a through opening or pass-through opening like the respective through openings 33a. This means that the respective pin element 31a can also be guided or inserted completely through the respective pin receiving element 32a. To attach the holding frame and the closure frame 31, 32, the pin members 31a and the pin receiving members 32a can then be glued, welded or heat staked together, for example.

Alternatively a plug-in connection or snap-in connection would also be conceivable, for example.

As shown in FIG. 2, the closure frame 32 has a smaller external dimension than the holding frame 31. This means that the holding frame 31 can also enclose the closure frame 32, for example. The holding frame 31 can thus be used in a particularly simple manner, for example, for arranging additional parts or components or fastening means on the cell separating device 30. In order to still be able to provide a flat contact surface 30a, 30b for the battery cells 20 by means of the cell separating device 30, the closure frame 32 is countersunk in the holding frame 31. This conversion of the first holding frame 31 with a lowered closure frame 32 can be explained in more detail with reference to FIG. 3.

Figure 3:
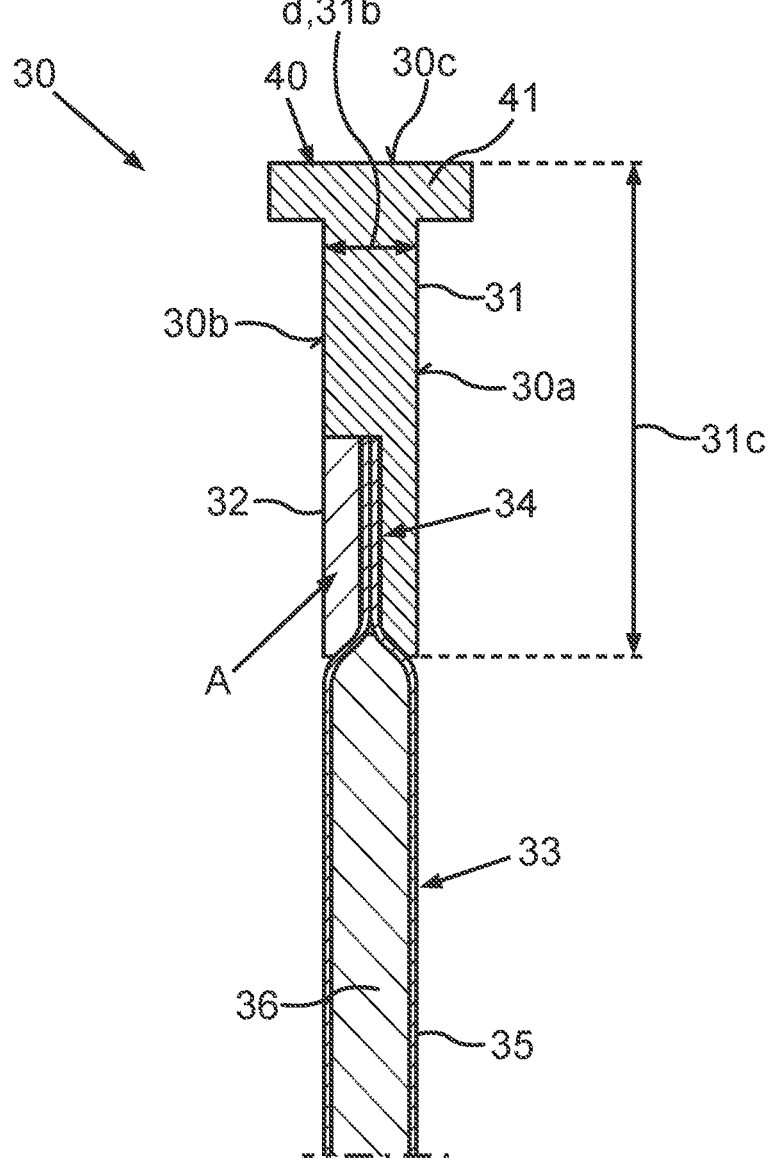
FIG. 3 shows a schematic representation of the cell separating devices according to FIG. 2 in a lateral sectional representation.

FIG. 3 shows a schematic representation of a section of the cell separating device according to FIG. 2 in a sectional representation along the section axis FF. The first frame member has a receiving space A for receiving or countersinking the edge region 34 and the closure frame 32. In the receiving space A, a profile depth 31b, by which the specified distance d between the battery cells 20 in the stacked structure V and thus a depth or width of the cell separating device 30 is specified, is reduced. The compression element 33 with the edge region 34 can now first be inserted into the receiving space A. The closure frame 32 can then be placed against the compression element 33. In the received state in the receiving space A, the closure frame 32 is surrounded by the holding frame 31 on two sides. The closure frame 32 rests directly on the holding frame 31 with one of the sides, and the closure frame 32 rests directly on the edge area 34 with the other of the two sides.

As shown in FIG. 3, the edge area 34 of the compression element 33 has a much narrower or less deep cross section than the rest of the body of the compression element 33. This allows a uniform profile depth 31b, i.e., a uniform depth or width of the cell separating device 30 to be implemented. The compression element 33 is formed from an enveloping material 35 and a compression material 36 to enable the change in cross section. The enveloping material 35 completely encases or encloses the compression material 36. The enveloping material 35 overlaps the compression material 36 in the edge area 34. As a result, the edge area 34 is formed from the enveloping material 35 only. The enveloping material serves, for example, to stabilize and protect the compression material from moisture. The compression material 36 forms the functional layer of the compression element 33. This means that the compression material can fulfill the function of thermal insulation and force absorption.

The overall desired profile depth 31*b* for the frame unit 37 or the cell separating device 30 results in the received state of the compression element 33 and the closure frame 32 in the receiving space A. The profile depth 31*b* can be adapted overall, for example to a width or depth T of the battery cells 20. For example, the profile depth can be between two and four millimeters.

A profile width 31*c* of the frame unit 37 is also shown in FIG. 3. The profile width 31*c* defines the dimensions of the interior space I, which is defined by the frame unit 37. The profile width 31*c* also specifies the respective proportion of the contact surfaces 30*a* and 30*b* which the frame unit 37 and the compression element 33 form. Due to the configuration with the receiving space A, the holding frame 31 defines the profile width 31*c* in the present case. The closure frame 32, on the other hand, has a smaller or smaller profile width. The profile width 31*c* for the frame unit 37 can be adapted to a length L and height H of the battery cells in the stacked structure V. Conventional battery cells 20 can have a length of 150 to 270 millimeters, for example. A height can be 100 millimeters, for example. The profile width 31*c* can accordingly be five to ten millimeters, for example. This means that the profile width 31*c* can be between two and 20 percent of the respective contact surface 30*a*, 30*b* in relation to a height H and length L of the battery cells, for example.

The design of the cell separating device 30 with the incompressible frame unit 37 with the respective profile width 31 can be configured such that the battery cells 20 in the outer regions of the contact surfaces 20*a* 20*b* generally only expand in the micron range during swelling. The main expansion or increase in volume takes place in the area of the compression element. So-called clamping elements or tension elements for holding the stacked structure V in the module housing 11 are generally also in contact with the outside areas of the cell.

FIG. 3 also shows that the holding frame 31 has a retaining web structure 40 with a retaining web 41 in the area of the side face 30*c*. The retaining web 41 can extend along the entire side face 30*c*, for example. The retaining web 41 protrudes from the side face 30*c* perpendicularly to the two opposing contact surfaces 30*a* and 30*b*. The cell separating device 30 thus has a T-shaped cross section. When arranging the cell separating device 30 in the stacked structure V, the retaining web 41 can now be placed onto or placed against the respective side face 20*a* of the adjacent battery cells 20. That is, the retaining web 41 overlaps the side faces 20*a* of the adjacent battery cells 20. As a result, the retaining web 41 can exert a retaining force on the battery cells 20 and the battery cells in the stacked structure V, for example when the battery module 10 is formed, downwards, i.e., in the direction of the side faces 20*b* and 30*d* are held.

When used in a battery module 10, the cell separating device 30 in the stacked structure V can fulfill other functions in addition to the aforementioned functions. For example, the cell separating device 30 can serve as a positioning aid in the battery module 10 or as a fastening aid for additional components of the battery module 10. FIG. 4 shows a schematic sectional representation of one of the cell separating devices 30 according to FIG. 1 as viewed from one of the contact surfaces 30*a*, 30*b*. The cell separating device 30 is arranged in a module housing 11. The module housing 10 can, for example, be arranged or fastened in a specified installation position L in a battery housing 12 for use in a drive battery. According to FIG. 4, the side face 30*d* of the cell separating device 30, configured as the bottom side, in the installed position L faces a housing bottom 12*a* of the battery housing 12 or is attached or arranged on it. As shown in FIG. 4, the cell separating device 30 and thus also the battery cells 20 do not rest directly on the housing base 12*a* in the arranged state in the module housing. The side faces 20*d* and 30*d* are therefore at a small spacing from the battery housing base 12*a*. This spacing can be specified by the strength or thickness of the module housing 11.

For cooling the battery cells 20, a heat sink of a cooling device, such as a battery cooling circuit, for example, can be arranged adjacent to the battery housing floor 12*a*. For thermal contact with the battery cells, the battery housing base 12*a* is coated or covered with a thermally conductive medium 16, such as a thermally conductive paste. This thermally conductive medium 16 is referred to as a gap filler and can fill the gap between the battery case bottom 12*a* and the bottom side faces 30*d* and 20*d*. To be able to absorb excess thermally conductive medium 16 and thus be able to provide a better form fit with the thermally conductive medium 16, a recess structure 47 is incorporated at the side face 30*d* of the cell separating device 30. The recess structure 47 comprises a plurality of recesses 48 which are spaced apart from one another along the side face 30*d*. In the present case, the recesses 48 have an essentially triangular cross section.

In addition, a spacer structure 45 is arranged on the side faces 30*d*, i.e., the bottom side, and the side faces 30*e* and *f*, i.e., the wall sides of the cell separating device 30. The spacer structure 45 comprises a plurality of spacer means 46 which are configured as spacer blocks 46 in the present case. Four spacer blocks are shown on the side face 30*d*, for example. In the present case, two spacer blocks 46 are drawn in for each of the side faces 30*e* and 30*f*. These spacer blocks 46 can be used as a positioning aid in the production of the battery module 10, i.e., when introducing the stacked structure V into the module housing 11. In addition, as shown in FIG. 11, the spacer blocks 46 protrude from the holding frame 31 beyond the respective side face 30*d*, 30*e*, 30*f*. As a result, the spacer blocks 46 for example are also suitable for protecting the battery cells 20, for example during transport and during production or manufacture.

On the cover side, that is to say the side face 30*c*, there are also a number of fastening means for various components on the holding frame 31, which the battery module 10 can use when it is used in the drive battery, for example. One component can be a gas discharge duct 13, for example, which can be fluidically connected to the breakout opening 23 of the respective battery cell. In the event of a defect in the respective battery cell 20, the harmful gas can be discharged via a respective ventilation system via the gas discharge duct 13, that is to say, away from the battery module 10. Two latching elements 42 in the form of latching lugs can be arranged on the side face 30*c* as a fastening means for fastening the gas discharge duct 13. The gas discharge duct can be fastened or connected to a corresponding counterpart by means of a snap-in connection.

Another component can be a ribbon conductor element 14, for example. The ribbon conductor element can be configured as a flexible printed circuit, for example, and can have one or more sensors for monitoring the battery cells 20. For the battery module 10, the ribbon cable element for contacting the battery cells 20 can be arranged on the side face 20*c* and can be routed along the stacking direction R across the entire stacked structure V to a monitoring device (not shown in FIG. 4). The ribbon conductor element can thus be used, for example, to record sensor data for the individual battery cells in the stacked structure V and to forward it to the monitoring device for evaluation. The sensor data can be a temperature value or an electrical resistance of the battery cells, for example. A slide-in element 43 can be arranged on the holding frame 31 on the side face 30*c* as fastening means for the ribbon conductor elements 14 along the stacked structure V, for example. In the present example, two such slide-in elements 43 are shown. The slide-in elements 43 are formed by a depression in the side face 30*c*, which is at least partially covered by an L-shaped projection. The projection runs along the side face 30*d* parallel to the respective contact surface 30*a* and 30*b*. To hold the respective ribbon conductor element 14, said element can thus be inserted parallel to the side face 30*c* under the projection of the slide-in element 43 and inserted into the depression. The projection prevents the ribbon conductor element from slipping upwards, and the recess prevents it from slipping sideways.

Another component can be typical conductor cables with a substantially cylindrical cross-section. These can be used to exchange data between the neighboring battery cells and the monitoring device, for example. Alternatively, such conductor cables 15 can also be used for communication between the monitoring device and an on-board control unit or battery management system of the motor vehicle, for example. A cable clamping element in the form of an omega clip is provided on the side face 30*c* of the holding frame 31 according to FIG. 4 as a fastening means for fastening such conductor cables 15. In this case, the conductor cable can be clamped from above into a feed-through opening of the omega clip and can thus be fastened to the cell separating device 30 by means of a clamp connection. In this case, the pass-through opening of the cable clamping element 44 is formed perpendicularly to the contact surfaces 30*a* and 30*b*. The conductor cable 15 can thus be guided along the stacking direction R in the stacked structure when it is clamped into the omega clip.

The fastening means and the spacer blocks 46 can be formed in one piece with the holding frame 31, for example. Thus, the holding frame 31 can be provided or manufactured as a casting or molding, for example.

Overall, the present exemplary embodiments show how a cell space separating element or an intercell material can be implemented that can be used both for electrical insulation of the battery cells 20 from one another and for thermal insulation and for absorbing swelling forces. Furthermore, holders and clips can be formed there, which are required for fastening, for example, module-internal cabling. Additional elements can also be clipped in there for fire protection or to route harmful gases. The production process can be improved using spacer or positioning elements, and the battery cells can also be protected during module production. In addition, the cell space separating element can be configured in such a way that excess amounts of gap filler are absorbed in the production process and an additional positive or non-positive connection can be formed between the battery module 10, gap filler, and battery housing 12.

The invention claimed is:

1. A cell separating device for spacing apart two respectively adjacent battery cells in a battery module, comprising:
    an incompressible frame unit which is configured to withstand a mechanical load force present in case of a specified condition of use when the cell separating device is in an arranged state between the two adjacent battery cells in the battery module, and
    a deformable compression element enclosed by the frame unit, which element is configured, in the arranged state, on the one hand to absorb the mechanical load force of at least one of the adjacent battery cells and, on the other hand, to thermally insulate the two adjacent battery cells,
    wherein the frame unit for enclosing the compression element has a first frame member and a second frame member, between which the compression element is arranged with a specified edge region,
    wherein for fastening the compression element between the frame members, the first frame member has at least one pin element and the second frame member at least one pin receiving element assigned to the respective pin element, which elements can be connected to one another in an intended fastening position, and the compression element has at least one assigned through-opening for the respective pin element in the specified edge region, through which the respective pin element can be passed.

2. The cell separating device according to claim 1, wherein, in the arranged state, a front and rear side of the frame unit form a contact surface of the cell separating device for the adjacent battery cells with the enclosed compression element, and at least one frame outside of the frame unit forms a side face of the cell separating device.

3. The cell separating device according to claim 1, wherein the first frame member has a receiving space which is configured to receive the specified edge region of the compression element and the second frame member, wherein, in the received state, the second frame member is surrounded at least on two sides by the first frame member in the receiving space.

4. The cell separating device according to claim 2, wherein at least a respective one of the side faces of the cell separating device has a spacer structure with at least one spacer which projects perpendicularly from the side face.

5. The cell separating device according to claim 2, wherein at least a respective one of the side faces of the cell separating device has a recess structure with at least one recess, wherein the recess structure is configured to receive a thermally conductive medium which, in the arranged state, is attached to a housing wall assigned to the battery module for thermally coupling the battery cells.

6. The cell separating device according to claim 2, wherein at least a respective one of the side faces of the cell separating device has at least one latching element which is configured for fastening a gas discharge duct for the battery cells by a snap-in connection.

7. The cell separating device according to claim 2, wherein at least a respective one of the side faces of the cell separating device has at least one slide-in element for inserting and holding at least one ribbon conductor element which is configured for data exchange between at least one of the adjacent battery cells and a monitoring device of the battery module.

8. The cell separating device according to claim 2, wherein at least a respective one of the side faces of the cell separating device has at least one cable clamping element for fastening a conductor cable by a clamping connection, wherein the conductor cable is configured for data exchange between at least one of the adjacent battery cells and a monitoring device of the battery module.

9. The cell separating device according to claim 2, wherein at least a respective one of the side faces of the cell separating device has a retaining web structure with at least one retaining web which projects perpendicularly to the two opposing contact surfaces along said side face, and the retaining web overlaps a side face of the respective adjacent battery cells which is adjacent to said side face in the arranged state.

10. The cell separating device according to claim 1, wherein the compression element has an envelope material and a compression material, wherein the compression material is completely enveloped by the envelope material and the specified edge region of the compression element is formed only by the covering compression material.

11. The cell separating device according to claim 2, wherein the first frame member has a receiving space which is configured to receive the specified edge region of the compression element and the second frame member, wherein, in the received state, the second frame member is surrounded at least on two sides by the first frame member in the receiving space.

12. The cell separating device according to claim 11, wherein at least a respective one of the side faces of the cell separating device has a spacer structure with at least one spacer which projects perpendicularly from the side face.

13. The cell separating device according to claim 11, wherein at least a respective one of the side faces of the cell separating device has a recess structure with at least one recess, wherein the recess structure is configured to receive a thermally conductive medium which, in the arranged state, is attached to a housing wall assigned to the battery module for thermally coupling the battery cells.

* * * * *